Feb. 4, 1941.  O. BRAY ET AL  2,230,929
SAW BENCH
Filed Nov. 17, 1938  2 Sheets-Sheet 1

Inventors
A. R. Dawson, O. Bray
By L. F. Randolph
Attorney

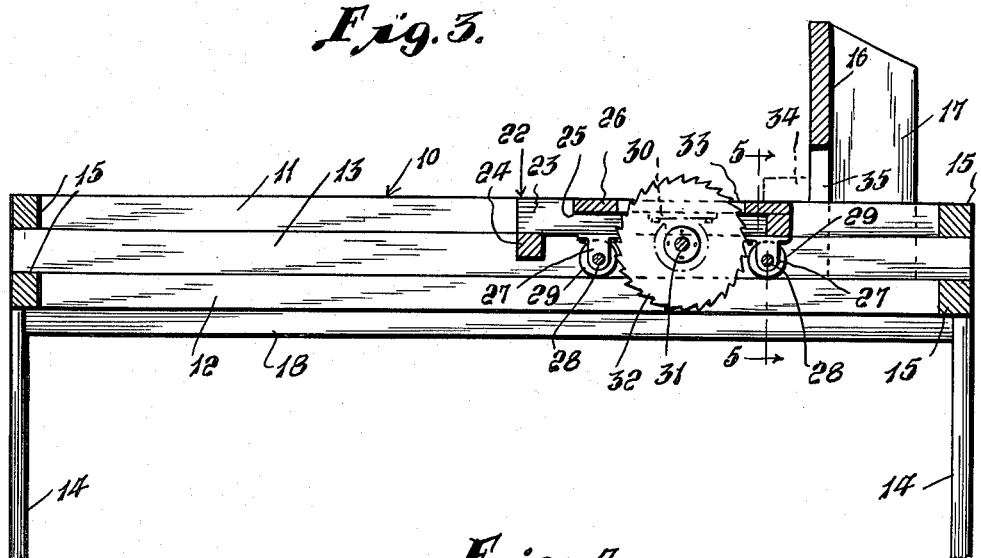
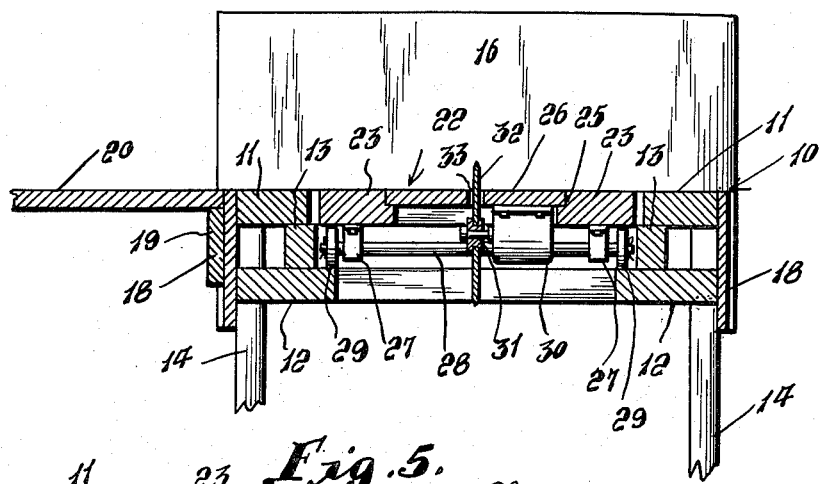
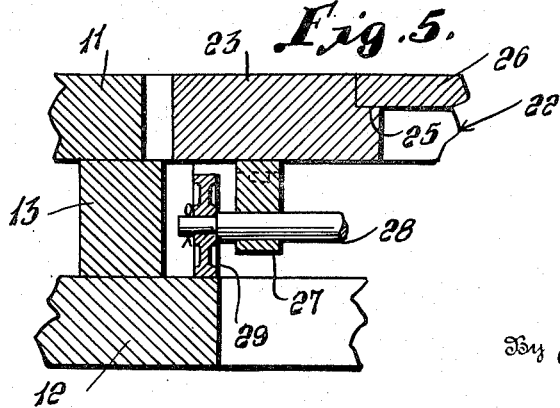

Patented Feb. 4, 1941

2,230,929

UNITED STATES PATENT OFFICE 2,230,929

SAW BENCH

Overton Bray and Arla R. Dawson, Burley, Idaho

Application November 17, 1938, Serial No. 241,060

3 Claims. (Cl. 143—47)

This invention relates to an improved saw bench having a rotary saw movably mounted therein for engagement with the material to be cut.

It is an aim of this invention to provide a saw bench having a carriage movably mounted therein and adapted to support a saw whereby the saw may be moved into and out of engagement with the material to be cut which is positioned and rigidly held on said bench.

More particularly, it is an aim of this invention to provide a saw bench having rails to be engaged by the wheels of a carriage and a stop adjacent one end of said bench to hold a piece of material to be cut while being engaged by a saw carried by said carriage.

Still a further object of the invention, is to provide a carriage having a removable plate and a motor mounted on the underside of said plate to the shaft of which is keyed a rotary saw with a portion of the blade of said saw extending upwardly through said plate and adapted to engage a piece of material as the carriage moves beneath said material.

Other objects and advantages of the invention will hereinafter become more fully apparent from the following description of the drawings, which illustrate a preferred embodiment thereof, and wherein:

Figure 3 is a vertical sectional view taken on the line 3—3 of Figure 2,

Figure 4 is a vertical sectional view taken on the line 4—4 of Figure 2, and

Figure 5 is a vertical sectional view taken on the line 5—5 of Figure 3.

Figure 1:
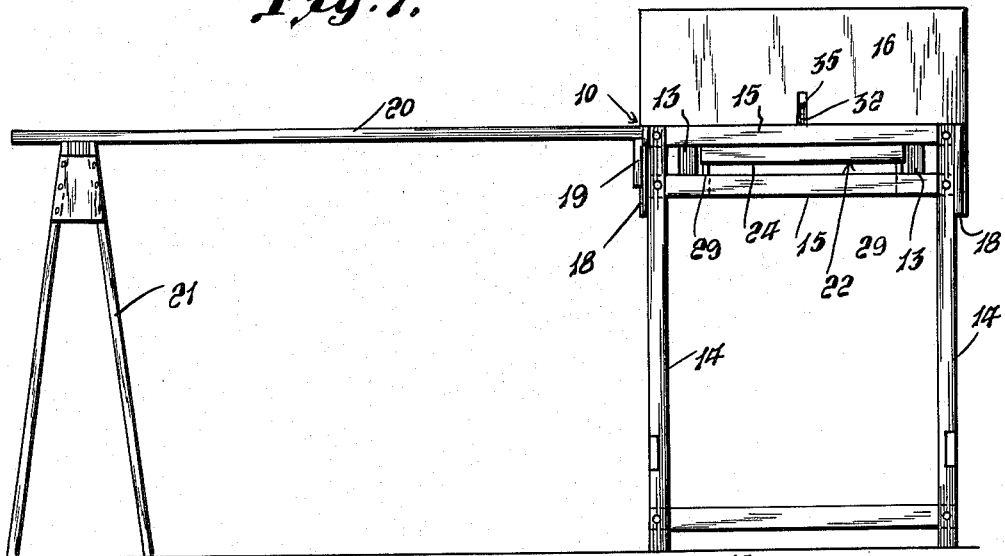
Figure 1 is a side elevational view of the invention.
Figure 2:
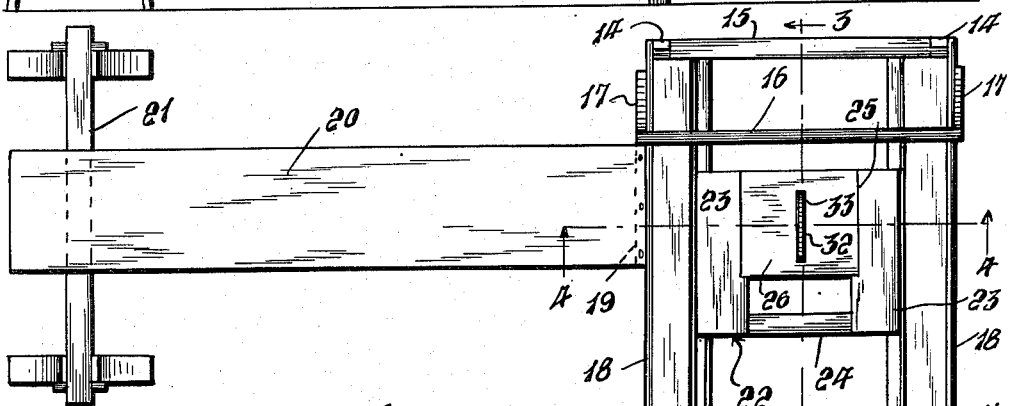
Figure 2 is a top plan view of the same.
Figure 2:
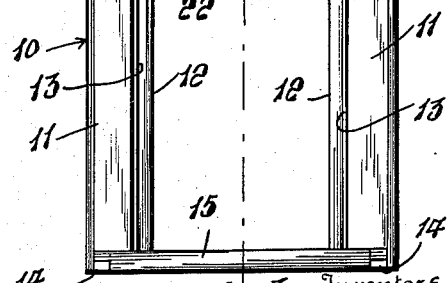

Referring more particularly to the drawings, wherein like reference characters designate like or corresponding parts throughout the different views, 10 designates generally the saw bench which is in the form of an open frame having the top and bottom side beams 11 and 12, respectively, and the intermediate beams 13 which connect the pairs of beams 11 and 12. The beams 12 extend beyond the beams 11 and 13 so that their inner longitudinal edges form rails for a purpose which will hereinafter be described. The bench 10 also includes the depending legs 14 which depend from its four corners and by means of which it is supported, and the end members 15 which connect the beams 11, 12 and 13 at their ends.

Extending upwardly from the bench 10 adjacent one of its ends, is the transverse wall 16 provided with the sides 17, which depend downwardly beneath the lower edge of the wall 16 and which are secured in any suitable manner to the opposite sides of the bench 10. Secured along one of the sides 18 of the bench 10 is a board 19 on which rests one end of a board 20 the upper side of which lies flush with the top of the bench 10. Board 20 extends laterally from the bench 10 with one of its longitudinal edges abutting against the front face of the wall 16. The free end of the board 20 may be supported in any suitable manner as by means of the saw horse 21.

A carriage designated generally 22 includes the corresponding spaced side beams 23 which are connected at their ends by the transverse bars 24 and which are provided with the cut-out portions 25 in the upper part of their adjacent edges, which extend a portion of the length of the beams 23 and which are adapted to receive and removably mount a plate 26. Brackets 27 depend from the opposite ends of the beams 23 to support the transversely disposed axles 28 on the opposite ends of which are journaled the wheels 29.

Carriage 22 is adapted to be mounted in the opening of the bench 10 with the wheels 29 engaging the rails formed by the beams 12 which extend inwardly beyond the beams 11 and 13 to movably support the carriage 22 in the bench 10 and to position it so that its upper edge will lie flush with the upper edge of the bench 10, as best seen in Figure 4. Secured to the underside of the plate 26 is an electric motor, of conventional construction, designated 30 provided with the driven shaft 31 to which is keyed the rotary saw blade 32, a portion of which extends upwardly through the slot 33, in the plate 26, to engage a piece of material, as seen in dotted lines in Figure 3, designated 34.

From the foregoing it will be seen, that pieces of material 34 may be placed on the board 20 with a portion engaging against the front face of the wall 16 and held rigidly while the carriage 22 is moved into and out of engagement therewith to thereby accurately cut the material to any desired depth and along any desired line. By holding the material 34 at an angle to the wall 16 it may be cut diagonally with much greater accuracy than if the saw was rigidly mounted and the material to be cut therefore had to be moved into engagement with the saw. The wall 16 is provided with a slot 35 so that the exposed portion of the saw 32 may pass therethrough to entirely sever a portion of the material 34 if desired.

Various modifications and changes in the construction and arrangement of the parts forming the invention may obviously be made and are contemplated and the right is therefore expressly reserved to make such modifications and changes as fall within the spirit and scope of the invention as hereinafter defined by the appended claims.

We claim as our invention:

1. In a device of the class described, a saw bench comprising an open frame having spaced longitudinal top portions forming a longitudinal slot therebetween, a supporting member extending laterally from one end of said bench and adapted to form a rest for the material to be cut, a carriage slidably mounted in said slot and provided with a slot in its top plate, said top plate being substantially in a plane with said top portions, a motor mounted on the underside of said carriage, and a rotary saw connected to said motor and having a portion thereof extending through the slot in said top plate to engage the material to be cut.

2. A saw bench comprising a frame having longitudinal top portions spaced to form a slot, said frame having spaced longitudinal bottom portions extending inwardly beyond the adjacent edges of the top portions to provide spaced rails, a carriage removably mounted in said slot and having wheels for engaging the rails to movably mount the carriage therein, said carriage having a top plate including a removable panel provided with a longitudinal slot, a motor secured to the underside of the panel, and a circular saw connected to said motor and extending partially through the slot in said panel.

3. A saw bench comprising a bench having an elongated open frame forming its top, longitudinal rails extending into the frame opening adjacent its bottom and from opposite sides of the opening, a transverse wall rising from the frame and forming an abutment, said wall having a vertical slot opening outwardly of its bottom edge; a carriage mounted on said rails and movable longitudinally in the frame opening, said carriage being movable beneath said wall, said carriage having a removable top plate provided with a longitudinal slot, a motor mounted on the underside of said top plate, and a circular saw blade driven by the motor and having a portion extending through the slot in the top plate, the slot in said wall being sized and disposed to receive said portion when the carriage is moved to a position beneath the wall.

ARLA R. DAWSON.
OVERTON BRAY.